United States Patent [19]
Brazell

[11] Patent Number: 5,611,378
[45] Date of Patent: Mar. 18, 1997

[54] TILTING ROUTER TABLE

[75] Inventor: Kenneth M. Brazell, Phoenix, Ariz.

[73] Assignee: Ryobi North America, Easley, S.C.

[21] Appl. No.: 588,900

[22] Filed: Jan. 19, 1996

[51] Int. Cl.⁶ .................................................. B27C 5/00
[52] U.S. Cl. .................. 144/135.2; 144/48.7; 144/84; 144/252.1; 144/286.1; 409/224; 409/229
[58] Field of Search .................................... 144/1.1, 48.7, 144/82, 84, 134.1, 135.2, 252.1, 286.1; 409/138, 221, 224, 229

[56] References Cited

U.S. PATENT DOCUMENTS

| | | | |
|---|---|---|---|
| 4,331,191 | 5/1982 | Buttner | 144/84 |
| 4,763,706 | 8/1988 | Rice et al. | 144/84 |
| 4,881,585 | 11/1989 | Bergler | 144/135.2 |
| 4,884,604 | 12/1989 | Rice et al. | 144/84 |
| 4,940,067 | 7/1990 | Beard | 409/224 |
| 5,025,841 | 6/1991 | Totten | 144/135.2 |
| 5,396,937 | 3/1995 | Clausen | 144/84 |

*Primary Examiner*—W. Donald Bray
*Attorney, Agent, or Firm*—Brooks & Kushman P.C.

[57] ABSTRACT

A router table assembly includes a tiltable table subassembly which allows positioning of the router axis horizontally or perpendicularly with respect to the base, while allowing angular adjustment of the table subassembly. A base pivotably supports the table subassembly, the subassembly including a primary table pivotably attached to the base, a fence affixable perpendicularly with respect to the primary table, a router mounting plate shiftably attached to the primary table and adapted to receive a router, and an adjustment mechanism cooperating with the router mounting plate and the primary table enabling a user to transversely vary the position of the router mounting plate for router adjustment.

17 Claims, 5 Drawing Sheets

TILTING ROUTER TABLE

TECHNICAL FIELD

The present invention relates to woodworking, and more particularly, to a router table for use in orienting a router with respect to a workpiece for precision woodworking operations.

BACKGROUND OF THE INVENTION

Many woodworking operations, particularly cutting finger joints, slots, and decorative trims, require precise location of the cut, especially for tightly-fitting adjacent components. Plunge routers are widely used by woodworkers in order to accomplish such precisely located cuts in manufacturing fitting joints, slot mortising, horizontal boring, and over-arm routing operations.

Router tables are also widely used because of their ability to make more precise cuts than can be made by hand. A router table is typically a horizontal work surface under which a conventional router may be mounted in order to use it as a shaper by moving a workpiece relative to the router bit, rather than moving the router bit relative to the workpiece. Often, such router tables are inconvenient to use because adjustment of router bit position must be accomplished by adjusting the router on its base, which is difficult to do with the router mounted upside down underneath a router table.

In some types of woodworking, such as mortise and tenon work, it is desirable to allow universal variation of the main table and router bit with respect to the workpiece. To maintain the workpiece in position relative to the cutter bit, some prior art router tables are provided with elongated fences that are connected to the top of the main table so that they can be moved laterally toward and away from the cutter bit. In this type of arrangement, it may be cumbersome and potentially dangerous for a user to attempt certain horizontal end cuts while manually holding the workpiece against the fence in a position perpendicular to the main table.

Accordingly, it is desirable to provide a router table which allows safe and convenient positioning and securing of a workpiece in positions perpendicular to the main table while allowing simple and accurate adjustment of the router bit with respect to the workpiece.

SUMMARY OF THE INVENTION

The present invention overcomes the above-referenced shortcomings or prior art router table assemblies by providing a router table design which includes a tiltable table subassembly. The subassembly includes a primary table and fence which may be tilted together. This configuration allows universal positioning of the router axis with respect to the base. In this manner, positioning of an elongate workpiece parallel or perpendicularly with respect to the router axis is accomplished accurately and efficiently, and adjustment of the router bit is performed conveniently.

A router table in accordance with the present invention includes a base, a table subassembly, and a tilting mechanism for tilting the table subassembly with respect to the base. The table subassembly includes a primary table pivotally attached to the base, a fence affixable perpendicularly with respect to the primary table, a router mounting plate shiftably attached to the primary table and adapted to receive a router, and an adjustment mechanism enabling a user to transversely vary the position of the router mounting plate for router bit adjustment. The tilting mechanism enables the table subassembly to be pivoted relative to the base and locked in at least two positions, a primary position where the primary table is generally horizontal and the router axis is oriented vertically, and a secondary position where both the fence and the router axis are generally horizontal.

More specifically, the present invention provides a router table comprising a base with a primary table pivotally attached to the base and shiftable between a generally horizontal position and a generally vertical position. The primary table includes a generally planar support surface and an opposed surface with a slot extending therebetween. A fence is affixable perpendicularly with respect to the primary table. The fence includes a generally planar support surface, which collectively with the primary support surface, would support a workpiece. The workpiece is movable along a longitudinal axis parallel to the primary table and fence. The router mounting plate is shiftably attached to the opposed surface of the primary table adjacent the slot extending through the primary table. The mounting plate is adapted to receive a router, and includes an aperture formed through the support surface in alignment with the slot extending through the primary table to enable a rotary cutting tool mounted in the router to extend beyond the primary table support surface to engage a workpiece. An adjustment mechanism cooperates with the router mounting plate and the primary table enabling the user to transversely vary the position of the router mounting plate relative to the primary table, thereby enabling the location of the rotary cutter to be varied with respect to the workpiece. The tilting mechanism enables the table sub-assembly, including the primary table, fence, router mounting plate, adjustment mechanism, and the router to be pivoted relative to the base and locked in any position between 0° and 90°. In the primary position, the primary table is generally horizontal and the router axis is oriented vertically, and in the secondary position, the fence and the router axis are generally horizontal.

Accordingly, an object of the present invention is to provide a router table which maintains a 90 degree angle of the router axis with respect to the main table while allowing the entire table subassembly to be tipped angularly for a convenient horizontal routing setup.

Another object of the present invention is to provide a router table which allows convenient and accurate positioning of a workpiece relative to a router bit, even in a position perpendicular to the main table.

Yet another object of the present invention is to provide a router table with a tiltable table subassembly, including a main table and fence affixable perpendicularly with respect to each other, each table being usable as a work surface for supporting a workpiece.

Still another object of the present invention is to provide a router table which includes a power switch mounted to the base which allows the user to access the power quickly in an emergency situation for disabling the router.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
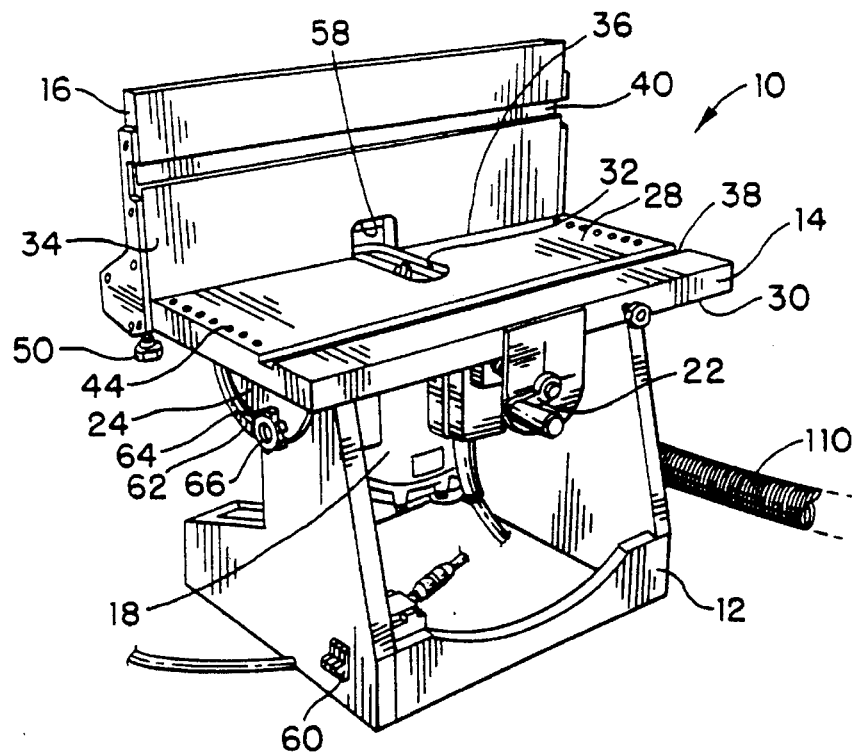
FIG. 1 shows a perspective view of a tilting router table in accordance with the present invention.
Figure 2:
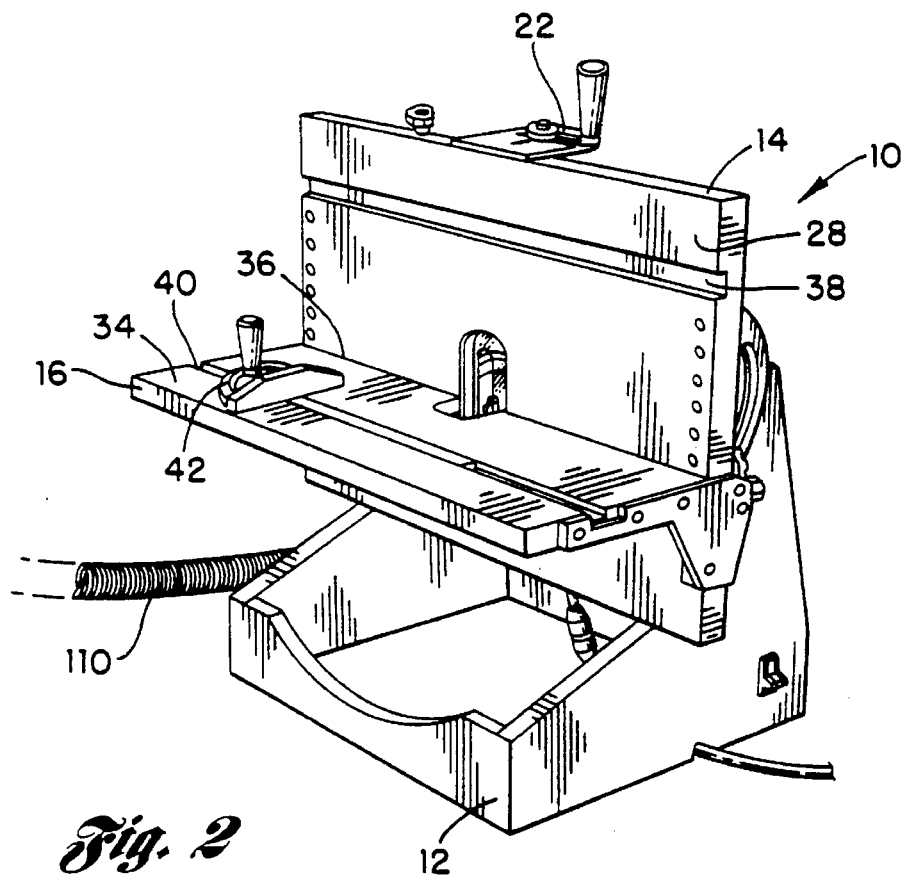
FIG. 2 shows a perspective view of the tilting router table shown in FIG. 1 with the table subassembly rotated 90°.

A tilting router table 10 is generally shown in the perspective views of FIGS. 1 and 2. The tilting router table 10 includes a base 12 which pivotally supports a primary table 14. A fence 16 is affixable perpendicularly with respect to the primary table 14. A router 18 is attached to the primary table 14 by a router mounting plate 20 (shown in FIG. 6). An adjustment mechanism 22 is provided for adjusting position of the router 18 with respect to the primary table 14.

A tilting mechanism 24 enables the table subassembly, which includes the primary table 14, fence 16, router 18, router mounting plate 20, and adjustment mechanism 22 to be pivoted relative to the base 12, and locked in any position between 0° and 90°. In a primary position, shown in FIG. 1, the primary table 14 is generally horizontal and the router axis 26 (see FIG. 4) is oriented vertically. In a secondary position, shown in FIG. 2, the fence 16 and the router axis 26 are both oriented generally horizontally.

The primary table 14 includes a generally planar primary support surface 28 and an opposed surface 30 (see FIG. 6) with a transverse slot 32 extending between the two surfaces 28,30. The fence 16 also includes a generally planar secondary support surface 34. The secondary support surface 34 collectively with the primary support surface 28 would support a workpiece, the workpiece being movable along a longitudinal axis 36 parallel to the primary table and fence tables 14,16. A primary guide slot 38 and fence guide slot 40 are provided in the primary table 14 and fence 16, respectively, for receiving a miter gauge 42 for guiding longitudinal movement of a workpiece.

Figure 3:
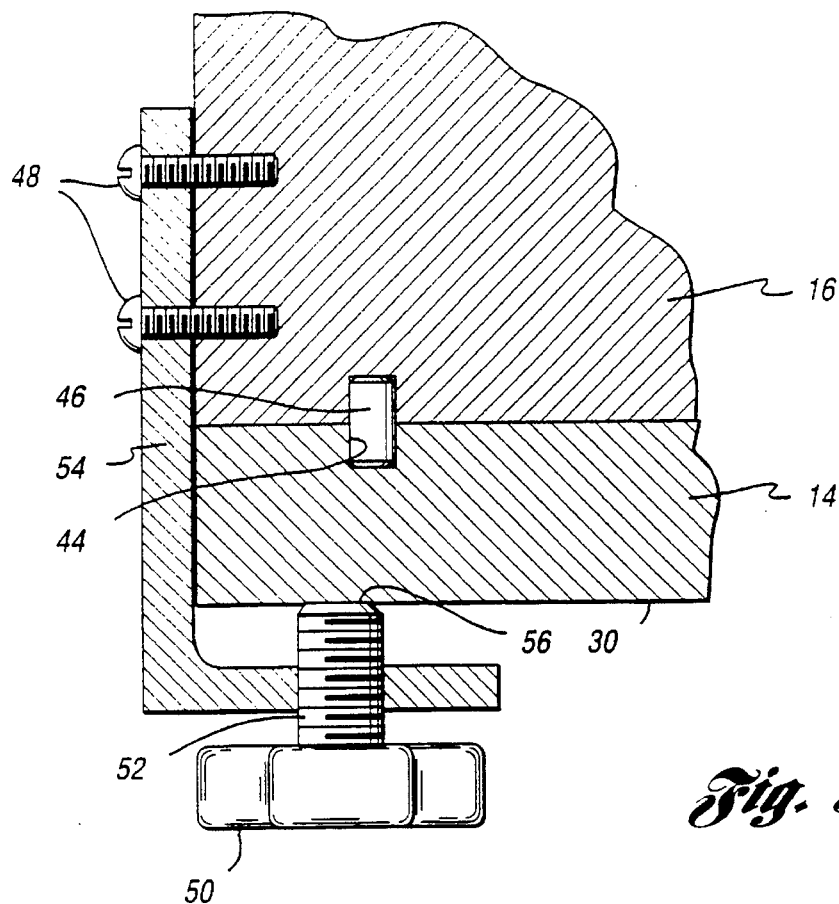
FIG. 3 shows a partial sectional view of an attachment mechanism for securing a fence to a primary table in accordance with the present invention.

The primary table 14 forms a plurality of alignment holes 44 thereon for selectively receiving locator pin 46 (see FIG. 3) for securing the fence 16 with respect to the primary table 14. The locator pin 46 extends from the fence 16 into the alignment holes 44. This locking mechanism is shown in FIG. 3. A bracket 54 is attached by screws 48 to the fence 16, and supports a table lock knob 50 below the primary table 14 for securing the fence 16 in a desired position along the primary table 14. Rotation of the table lock knob 50 causes the screw 52 to move with respect to the bracket 54, which causes the distal end 56 of the screw 52 to engage the opposed surface 30 of the primary table 14 to secure the fence 16 with respect to the primary table 14.

In order to move the fence 16 transversely with respect to the primary table 14, the lock knob 50 is rotated in order to disengage the distal end 56 of the screw 52 from the opposed surface 30 of the primary table 14, thereby allowing the locator pin 46 to be removed from the alignment hole 44, and the fence 16 may then be slid transversely across the primary support surface 28 to a different location. The fence 16 includes a notch 58 therein (see FIG. 1) to allow such transverse movement near the cutter head 61.

The router 18 is plugged into a stationary power switch 60 on the base 12 in order to allow the user to access the power switch 60 quickly and conveniently rather than attempting to reach under the primary table 14 to find the switch located on the router 18.

In order to accomplish tilting movement of the table subassembly with respect to the base 12, the tilting mechanism 24 is provided. The tilting mechanism 24 includes a lock plate 62 which is secured to the primary table 14. The lock plate 62 includes a slot 64 formed therein for receiving a lock bolt which is secured to the lock knob 66. The lock knob 66 is rotated to loosen the primary table 14, and the primary table is pivoted to a desired position, at which point the lock knob 66 is again rotated to secure the primary table 14 at the selected angular position with respect to the base 12.

Figure 4:
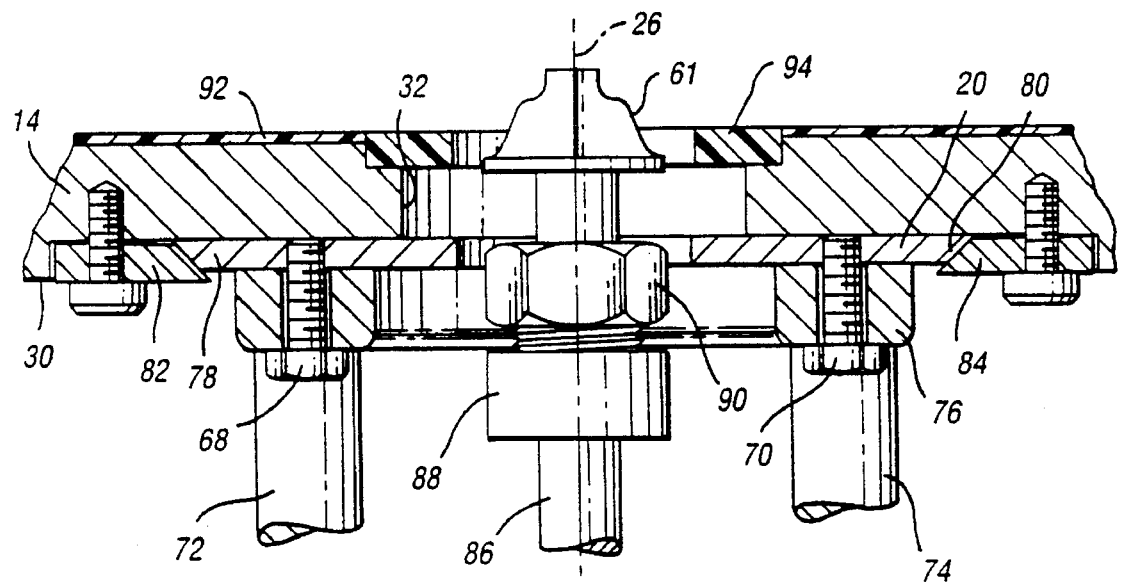
FIG. 4 shows a partial sectional view of a router mounting plate, primary table, and router shaft in accordance with the present invention.
Figure 6:
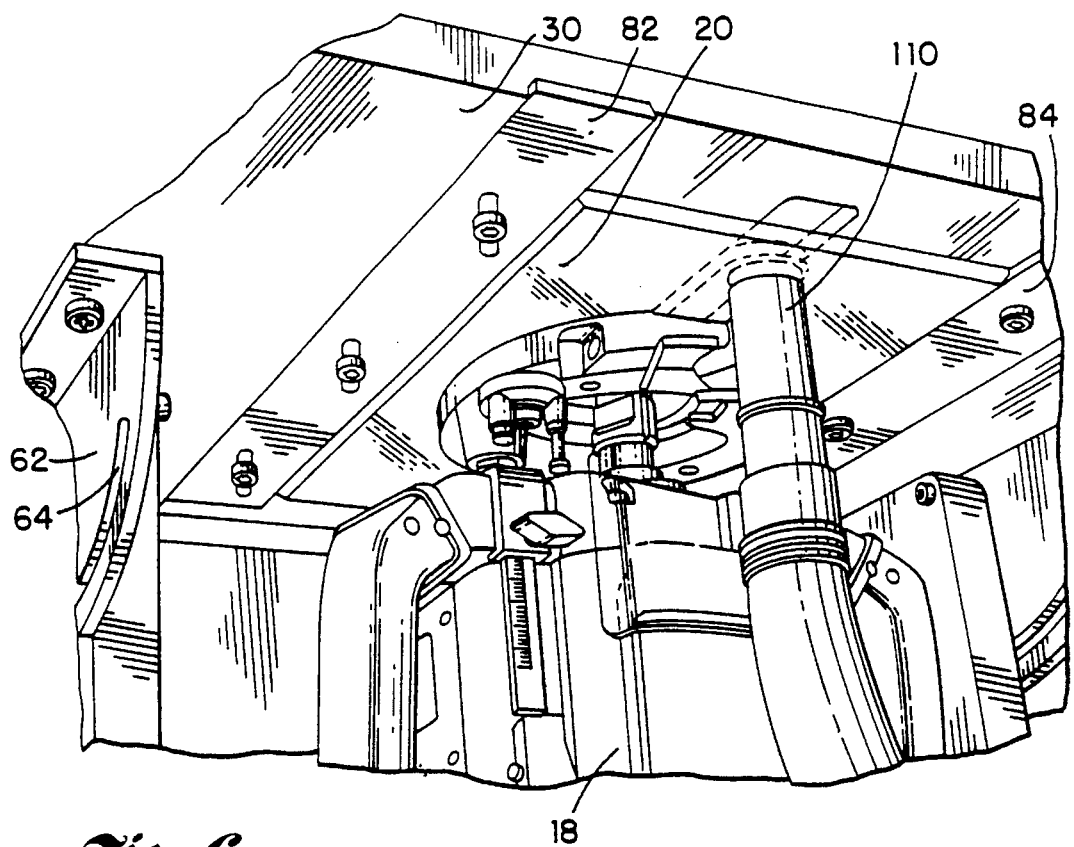
FIG. 6 shows a perspective view of a router secured to a router mounting plate of the tilting router table shown in FIG. 1.

Adjustment of the router 18 with respect to the primary table 14 is accomplished by the adjustment mechanism 22, which is more clearly described with reference to FIGS. 4–6. The router 18 is affixed to the router mounting plate 20. The router mounting plate 20 is shiftably secured with respect to the opposed surface 30 of the primary table 14. Bolts 68 and 70, as shown in FIG. 4, secure the router columns 72,74 and the router base 76 to the router mounting plate 20. Opposing ends 78,80 of the router mounting plate 20 are ramped to cooperate with the ways 82,84, which are secured to the primary table 14 for guiding the router mounting plate 20 as it slides along the opposed surface 30 of the primary table 14.

Figure 11:
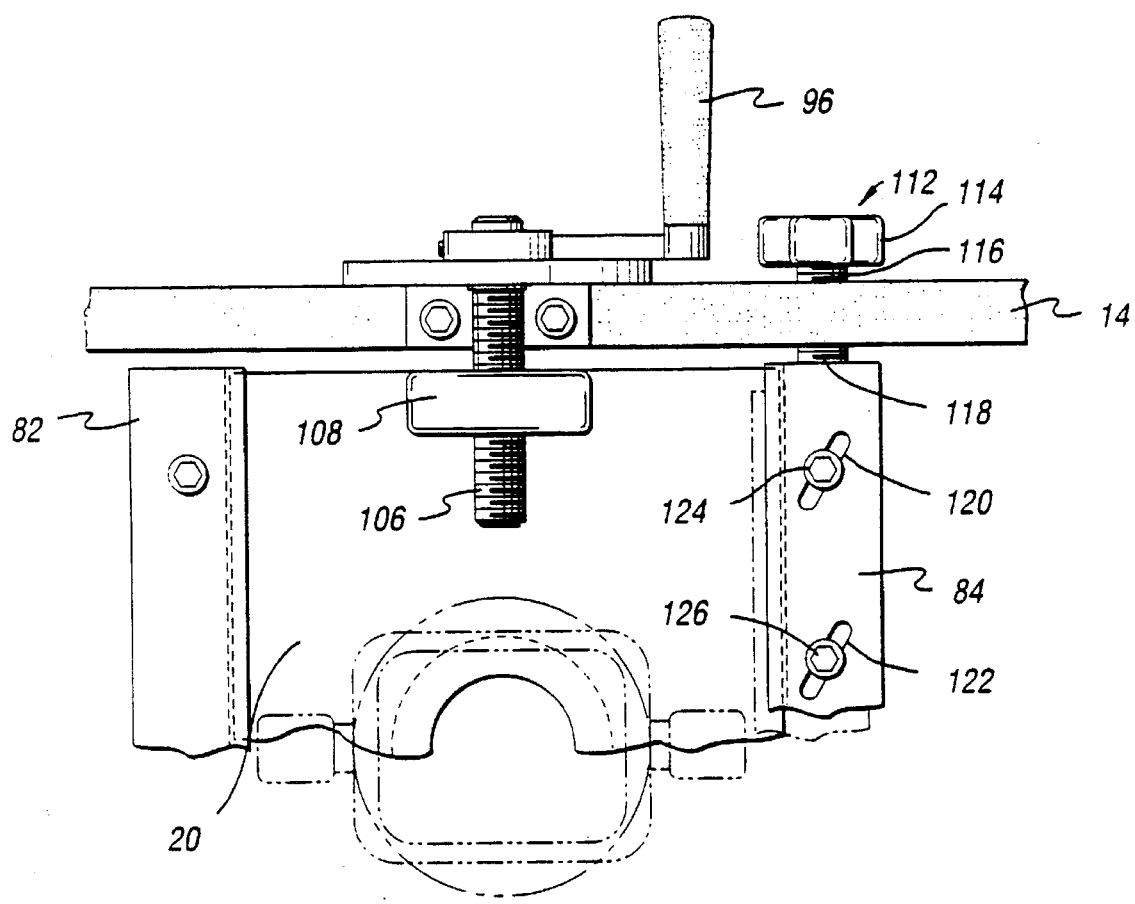
FIG. 11 shows a cut-away plan view of a router mounting plate, ways, and mounting plate locking mechanism in accordance with the present invention.

The router mounting plate 20 may be locked in position by the plate locking mechanism 112, shown in FIG. 11. The plate locking mechanism 112 includes a knob 114 secured to a screw 116, which threadedly engages the primary table 14. As the screw 116 is rotated, the end 118 of the screw 116 abuts against the way 84. The way 84 includes angled slots 120,122 which engage attachment bolts 124,126, respectively. As the screw 116 presses against the way 84, the bolts 124,126 travel along the slots 120,122, and the way 84 is moved inward against the router mounting plate 20. With the way 84 moved to the locked position (shown in phantom in FIG. 11), the router mounting plate 20 is locked in position. To unlock the plate 20, the knob 114 is rotated in the opposite direction, which withdraws the screw 116 from the way 84, thus allowing movement of the way 84 with respect to the bolts 124,126, unlocking the plate 20.

Turning back to FIG. 4, the router 18 includes a central shaft 86 and a collet 88 with a collet nut 90 for securing the router head 61 with respect to the router shaft 86. The router head 61 extends through the transverse slot 32 in the primary table 14, and beyond the formica top 92 which forms the primary support surface 28. In FIG. 4, a filler 94 is shown disposed within the transverse slot 32 around the cutter head 61. This filler 94 is a clear acrylic throat plate which surrounds the cutter area in order to reduce the size of the slot opening 32 around the router bit 61. This filler 94 helps provide support for small workpieces while improving efficiency of the dust collection system.

Figure 5:
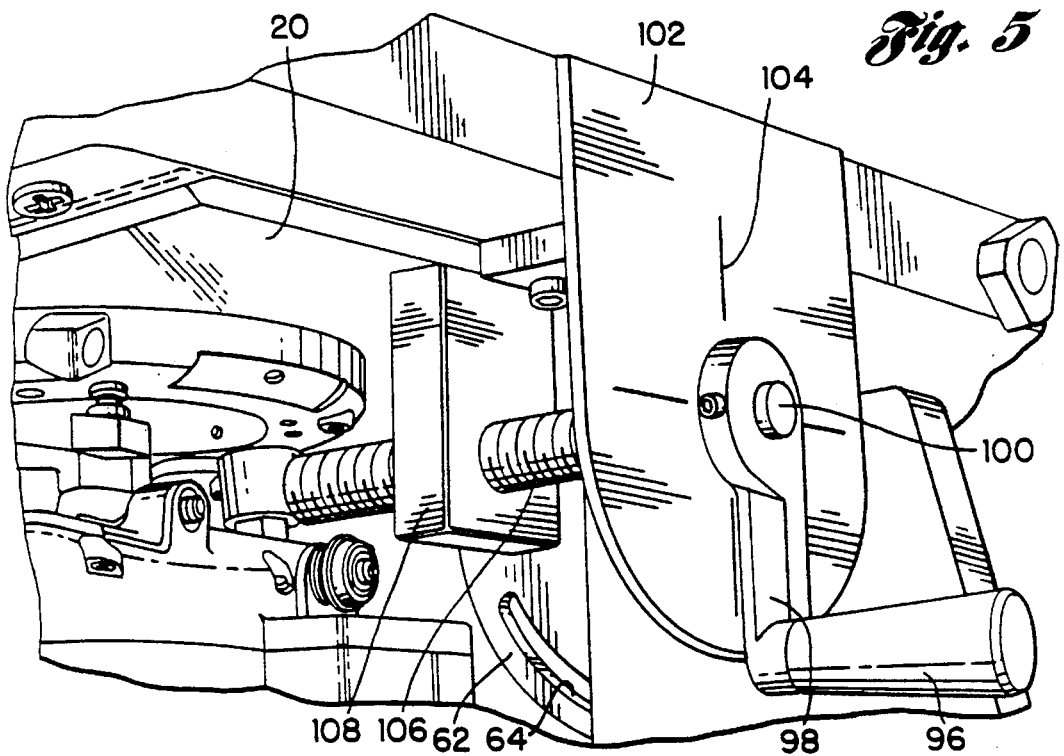
FIG. 5 shows a partially cut-away perspective view of an adjustment mechanism secured with respect to the primary table of the tilting router table shown in FIG. 1.

For transverse adjustment of the router bit 61 with respect to the primary table 14, the adjustment mechanism 22 is provided, as shown in FIG. 5. The adjustment mechanism 22 includes a crank handle 96 and crank arm 98 which are mounted to an adjustment shaft 100. The adjustment shaft 100 extends through the front plate 102. The front plate 102 includes location indicia 104 thereon for fine transverse adjustment of the router bit 61. Rotation of the crank handle 96 causes the threads 106 of the adjustment shaft 100 to pass along the internally threaded block 108, which is rigidly secured to the mounting plate 20, thereby moving the router mounting plate 20 to adjust the router bit 61. In a preferred embodiment, the thread pitch on the adjustment shaft 100 is 16 threads per inch, therefore, one revolution of the crank handle 96 equals a ⅙th inch displacement of the router bit 61. This displacement can be accurately tracked by reference to the indicia 104 on the front plate 102.

As shown in FIGS. 6–10, a dust collection system is provided by vacuum tube 110 secured to the mounting plate 20 adjacent the opposed surface 30 of the primary table 14 in order to capture sawdust from a workpiece. Vacuum tube 110 provides a means for collecting saw dust immediately adjacent cutter head 61 using a conventional workshop vacuum system not shown.

The primary table 14 has a vacuum channel 128 formed therein for communication with the vacuum tube 110. The router mounting plate 20 also provides a channel 130 which communicates with the channel 128. The vacuum tube 110 is received within the first aperture 132 of the router mounting plate 20 for creating a vacuum in the second aperture 134 for drawing debris from the cutting area.

Figure 7:
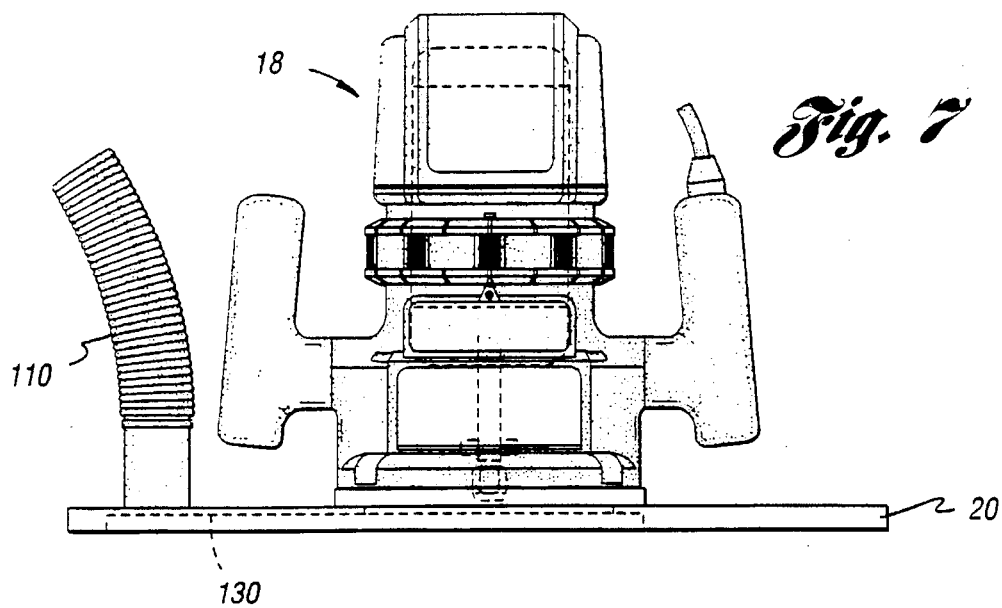
FIG. 7 shows a side elevational view of a router on a router mounting plate with a vacuum tube in accordance with the present invention.
Figure 8:
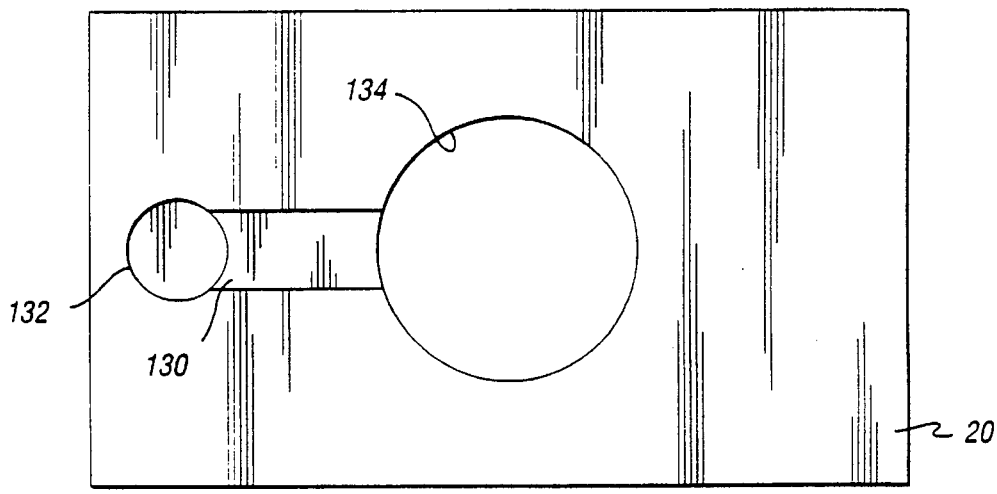
FIG. 8 shows a plan view of a router mounting plate in accordance with the present invention.
Figure 9:
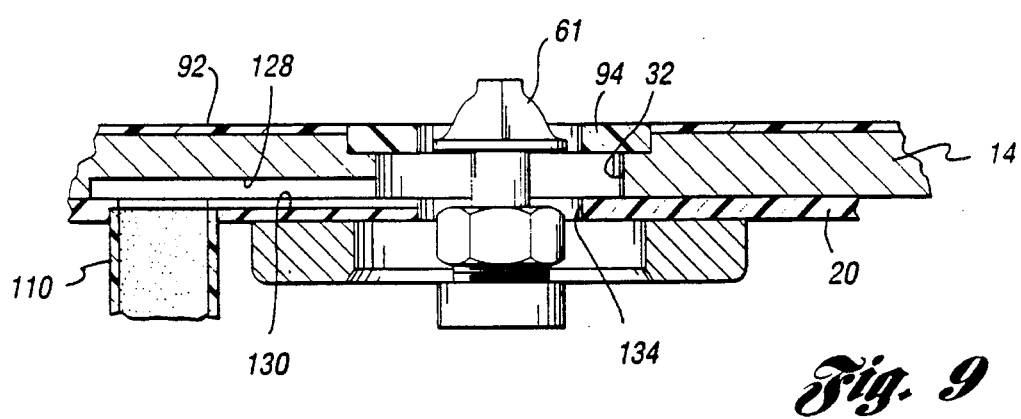
FIG. 9 shows a cut-away sectional view of a router mounting plate secured to a primary table in accordance with the present invention.
Figure 10:
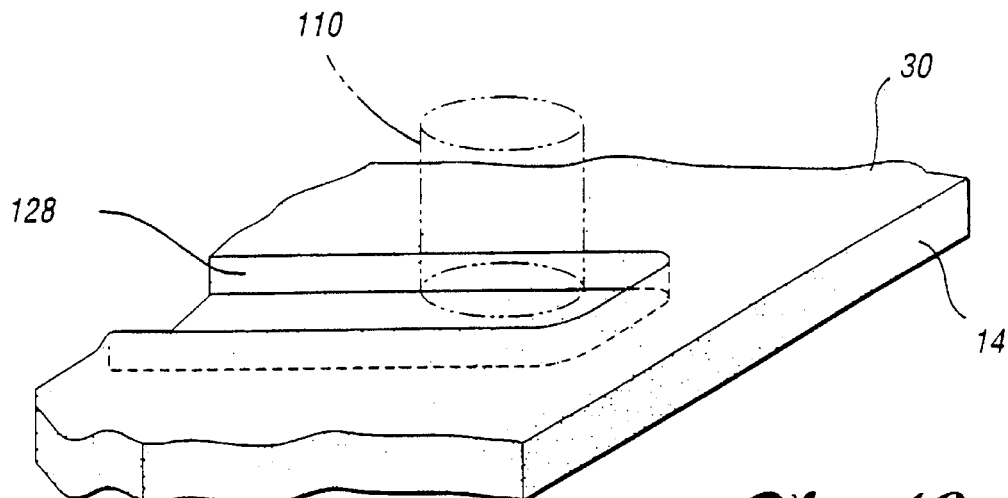
FIG. 10 shows a cut-away perspective view of a primary table having a vacuum channel in accordance with the present invention.

As shown in FIG. 7, the router 18, router mounting plate 20 and vacuum tube 110 may be removed as a unit from the table 10 and placed directly on a cutting surface. Because the vacuum tube 110 communicates through the channel 130 with the second aperture 134, debris may be vacuumed from the cutting area with the router 18 removed from the table 10.

This tilting router table 10 enables convenient and accurate cutting of a workpiece in a variety of orientations.

While the best mode for carrying out the invention has been described in detail, those familiar with the art to which this invention relates will recognize various alternative designs and embodiments for practicing the invention. Thus, the above-described preferred embodiment is intended to be illustrative of the invention which may be modified within the scope of the following appended claims.

What is claimed is:

1. A router table comprising:

a base;

a primary table pivotally attached to the base and shiftable between a generally horizontal position and a generally vertical position, said primary table having a generally planar support surface and an opposed surface and a slot extending therebetween;

a fence affixable perpendicularly with respect to the primary table, said fence having a generally planar support surface, which collectively with the primary support surface would support a workpiece, the workpiece being movable along a longitudinal axis parallel to the primary table and fence;

a router mounting plate shiftably attached to the opposed surface of the primary table adjacent the slot extending therethrough, said mounting plate being adapted to receive a router having a router axis generally perpendicular to the primary table support surface and having an aperture formed through the support surface aligned with the slot extending through the primary table to enable a rotary cutting tool mounted in the router to extend beyond the primary table support surface to engage a workpiece;

an adjustment mechanism cooperating with the router mounting plate and the primary table enabling the user to transversely vary the position of the router mounting plate relative to the primary table thereby enabling the location of the rotary cutter to be varied with respect to the workpiece; and a tilting mechanism enabling a table subassembly including the primary table, fence, router mounting plate, adjustment mechanism, and the router to be pivoted relative to the base and locked in at least two positions, a primary position where the primary table is generally horizontal and the router axis is oriented vertically and a secondary position where both the fence and the router axis are generally horizontal.

2. The router table of claim 1, wherein said fence is transversely adjustable along said primary table.

3. The router table of claim 2, wherein said primary table forms a plurality of alignment holes thereon, and said fence includes at least one pin extending therefrom for selective engagement within said alignment holes.

4. The router table of claim 1, wherein said fence is removable from said primary table.

5. The router table of claim 1, further comprising a vacuum tube positioned adjacent said slot for collection of sawdust.

6. The router table of claim 5, wherein said vacuum tube is positioned adjacent the opposed surface of said primary table.

7. The router table of claim 2, further comprising a locking mechanism for removably securing said fence with respect to said primary table.

8. The router table of claim 1, wherein said primary table and said fence each form a guide slot therein for slidably receiving a workpiece guide.

9. A router table for cutting a workpiece comprising:

a base;

a table subassembly including a primary table pivotally attached to the base, a fence affixable perpendicularly with respect to the primary table, a router mounting plate shiftably attached to the primary table and adapted to receive a router having a router axis, and an adjustment mechanism cooperating with the router mounting plate and the primary table enabling a user to transversely vary the position of the router mounting plate to vary the position of the router with respect to the fence; and a tilting mechanism enabling the table subassembly to be pivoted relative to the base and locked in at least two positions, a primary position where the primary table is generally horizontal and the router axis is oriented vertically and a secondary position where both the fence and the router axis are generally horizontal.

10. The router table of claim 9, wherein said fence is transversely adjustable along said primary table.

11. The router table of claim 10, wherein said primary table forms a plurality of alignment holes thereon, and said fence includes a plurality of pins extending therefrom for selective engagement within said alignment holes.

12. The router table of claim 9, wherein said fence is removable from said primary table.

13. The router table of claim 9, further comprising a vacuum tube positioned adjacent said slot for collection of sawdust.

14. The router table of claim 13, wherein said vacuum tube is positioned adjacent the opposed surface of said primary table.

15. The router table of claim 10, further comprising a locking mechanism for removably securing said fence with respect to said primary table.

16. The router table of claim 9, wherein said primary table and said fence each form a guide slot therein for slidably receiving a workpiece guide.

17. A router table comprising:

a base;

a primary table pivotally attached to the base and shiftable between a generally horizontal position and a generally vertical position, said primary table having a generally planar support surface and an opposed surface and a slot extending therebetween, said primary table forming a plurality of alignment holes thereon;

a fence affixable perpendicularly with respect to the primary table, said fence having a generally planar support surface, which collectively with the primary support surface would support a workpiece, the workpiece being movable along a longitudinal axis parallel to the primary table and the fence, said fence including a plurality of pins extending therefrom for selective engagement within said alignment holes for shiftably positioning said fence transversely with respect to said primary table;

a router mounting plate shiftably attached to the opposed surface of the primary table adjacent the slot extending therethrough, said mounting plate being adapted to receive a router having a router axis generally perpendicular to the primary table support surface and having an aperture formed through the support surface aligned with the slot extending through the primary table to enable a rotary cutting tool mounted in the router to extend beyond the primary table support surface to engage a workpiece;

a vacuum tube positioned adjacent said slot near said opposed surface of said primary table;

a locking mechanism removably securing said fence with respect to said primary table;

an adjustment mechanism cooperating with the router mounting plate and the primary table enabling the user to transversely vary the position of the router mounting plate relative to the primary table thereby enabling the location of the rotary cutter to be varied with respect to the workpiece; and a tilting mechanism enabling a table subassembly including the primary table, fence, router mounting plate, adjustment mechanism, and the router to be pivoted relative to the base and locked in at least two positions, a primary position where the primary table is generally horizontal and the router axis is oriented vertically and a secondary position where both the fence and the router axis are generally horizontal.

* * * * *